Dec. 14, 1926.

D. A. RIPLEY 1,610,883

METHOD OF AND APPARATUS FOR FORMING GLASS ARTICLES

Filed Oct. 16, 1924  2 Sheets-Sheet 2

INVENTOR
Daniel A. Ripley
By Kay, Totten & Martin
Attorneys

Patented Dec. 14, 1926.

1,610,883

UNITED STATES PATENT OFFICE.

DANIEL A. RIPLEY, OF PITTSBURGH, PENNSYLVANIA.

METHOD OF AND APPARATUS FOR FORMING GLASS ARTICLES.

Application filed October 16, 1924. Serial No. 743,991.

My invention relates to the method of and apparatus for forming glass articles, and particularly to the formation of blown or pressed glassware.

One object of my invention is to provide a method and means whereby glass articles of the same, or of different sizes may be simultaneously formed upon a single machine.

Another object of my invention is to provide an improved form of continuously operating glass blowing or pressing machines.

Another object of my invention is to provide an improved means and a method whereby the glass may be supplied from a furnace to a forming machine in a continuous stream.

Still another object of my invention is to simplify and improve generally the methods of and apparatus for forming glassware.

Figure 1:
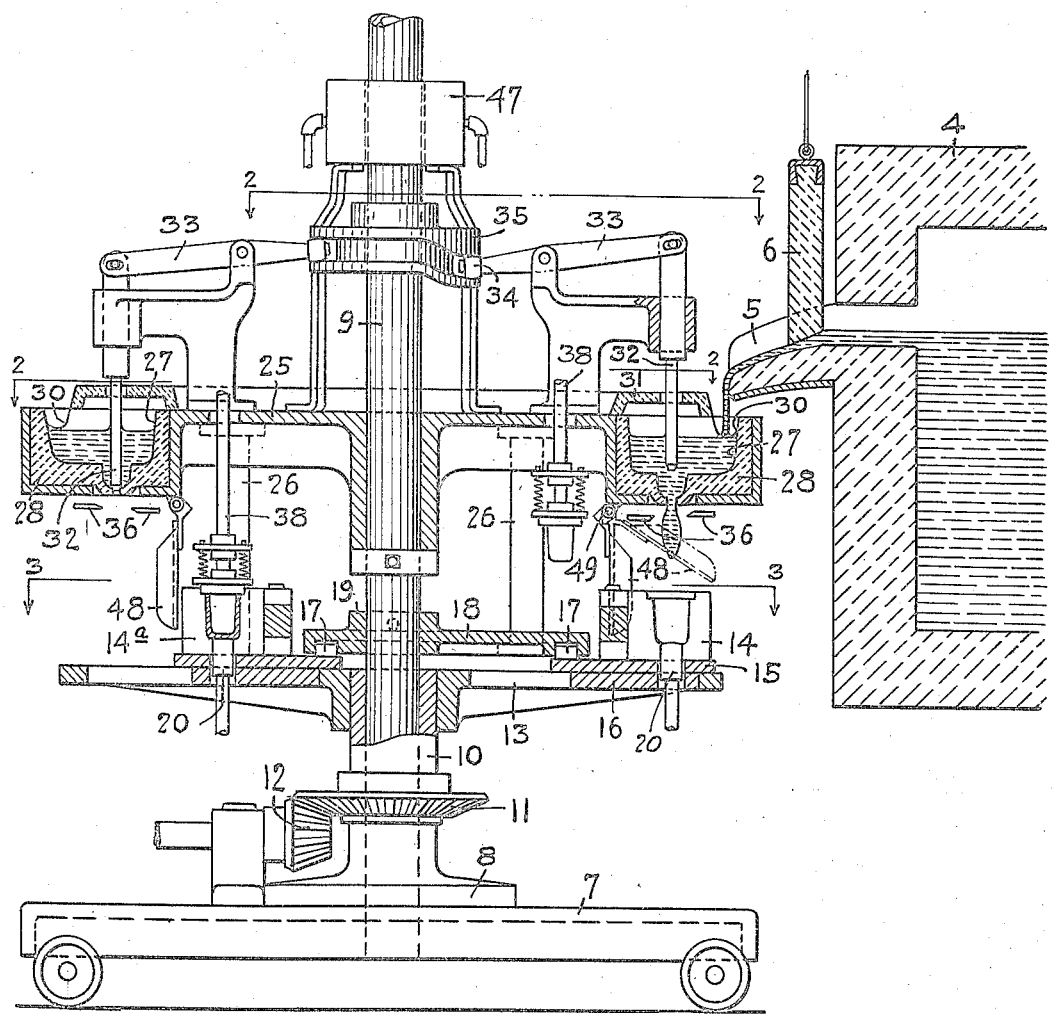
Figure 2:
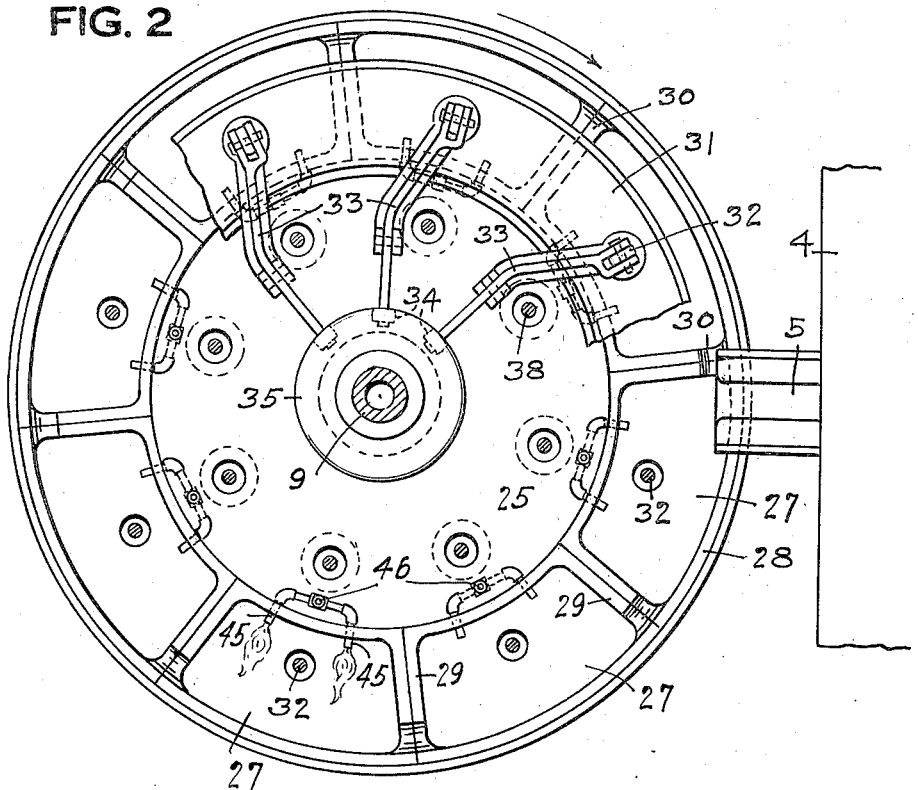
Figure 3:
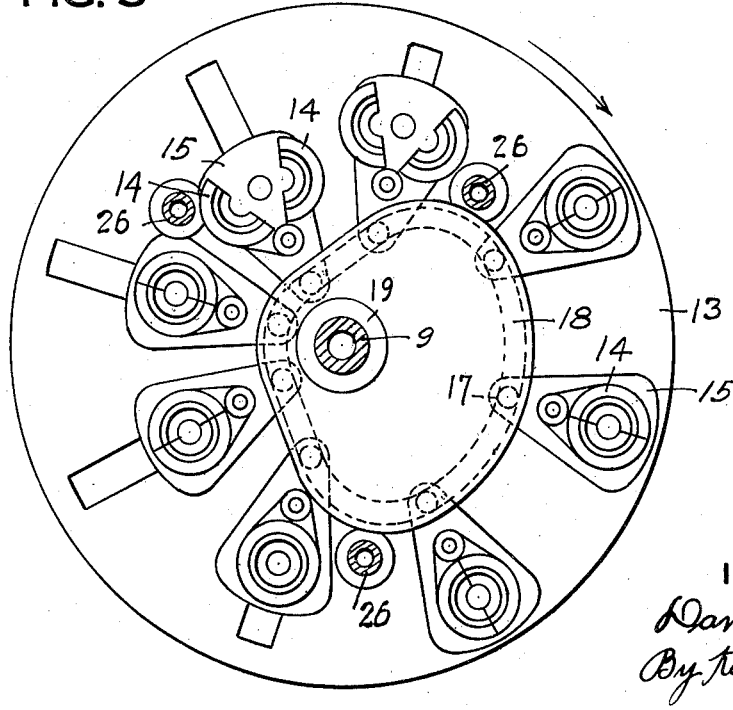

One manner in which my invention may be practiced, is shown in the accompanying drawings wherein Fig. 1 is a view, partially in elevation and partially in section, of a portion of a glass furnace and of a machine for forming the articles; Fig. 2 is a plan view of the apparatus of Fig. 1, and Fig. 3 is a sectional view taken on the line 3—3 of Fig. 1.

The drawing shows a portion of a glass furnace 4 provided with a spout 5 for the molten glass, and a gate 6 for controlling the flow of glass from the furnace. The glass so fed from the furnace is preferably supplied in a continuous stream to a machine which will now be described.

The machine may be mounted upon a truck 7, for the purpose of withdrawing it from the heat of the furnace when desired, provided with a pedestal 8 having a shaft 9 supported vertically. A sleeve 10 is rotatably mounted upon the shaft 8 and is provided at its lower end with a beveled gear wheel 11 that meshes with a bevel pinion 12 that may be driven from any suitable source of power.

A mold table 13 is rigidly secured to the sleeve 10 and supports a plurality of molds 14, 14ª, etc., that are disposed circumferentially of the table. The molds are mounted upon slide blocks 15 that are movable radially of the table in guide ways 16. The slide blocks are provided with cam rollers 17 at their inner ends that engage with a cam groove 18 formed as shown in Fig. 3. The cam groove 18 is formed in a spider or plate 19 that is rigidly secured to the stationary shaft 9. The molds 14, 14ª, are provided with a valve 20, as shown at 14ª, which operates in the usual manner to permit the escape of air when an article is being formed, and may also be utilized to eject the finished article.

It will be apparent that as the table 13 is rotated, the molds will be moved radially by reason of the cam and roller arrangement just referred to, for a purpose which will be hereinafter explained.

A table 25 is rotatably mounted upon the shaft 9, being vertically supported by struts or bosses 26 that extend upwardly from the mold table 13. The struts are rigidly connected to both tables so that they will move in synchronism.

The table 25 is provided with a plurality of pockets 27 adjacent to its periphery, that are preferably lined with a refractory material 28 and are divided by partitions 29, cut away somewhat as indicated at 30, in Fig. 1, for a purpose to be hereinafter described. The partitions may be dispensed with, if desired.

The pockets 27 are preferably partially closed at their tops by covers 31. As the table 25 rotates, the pockets move beneath the spout 5 and molten glass is supplied thereto from the furnace 4. The depressions 30 provide communication between adjacent pockets so that if larger charges are fed out of one pocket than out of an adjacent pocket, the surplus glass from the adjacent pocket will flow into the larger pocket to maintain the supply therein. Also this arrangement may prevent overflow of a pocket from which only small charges of glass are being fed. The pockets or receptacles 7 are provided with orifices in their bottoms with which plungers 32 co-operate to control the feed of glass to the molds therebeneath. The molds mounted upon the table 13 at a given time may be of different sizes and forms, and herein resides one of the important features of my invention.

The receiving chambers or pockets 27 having been supplied with glass as above explained, during movement of the table, at the desired point in the path of travel, preferably immediately after passing from beneath the spout 5, the plungers 32 are elevated through the medium of a lever 33 that carries a roller 34 which co-operates with a cam 35 that is rigidly secured to the stationary shaft 9, as shown more clearly in Fig. 1. This permits the glass to flow through the orifice in the bottom of the pocket 27 until a gob of the desired size is formed. This gob may then be cut off by shears indicated diagrammatically at 36. The shears may be of convenient form and operated in any desired manner, either automatically or manually, preferably automatically. At the proper time the roller 34 is raised by the cam 35 to close the orifice in the bottom of the chamber 27, thus shutting off the flow of glass therethrough.

The severed slug of glass drops into the mold therebeneath and the table is then rotated to such a position with respect to the cam 18 that it is moved radially inward as indicated at the left hand side of Fig. 1. At this point a pressing plunger 38 descends to form the article within the mold. The pressing plunger may be operated in a manner similar to the plungers 32 just described, or in any other well known manner. After pressing the article the plunger is withdrawn and the molds opened to permit of the discharge of the completed article, or the valve 20 raised to eject the articles.

It will be apparent that the articles may be formed by blowing instead of by pressing, or that the combination of pressing and blowing operations may be performed while the mold is in substantially the position shown in Fig. 1.

The levers 33 are preferably formed as shown in Fig. 2 so that they will not interfere with the movement of the plungers 38 that are in radial alignment with the feed plungers 32.

Burners 45 may be provided for maintaining the glass in the pockets 27 at the proper temperature, particularly when small charges are being fed from said pockets. The burners 45 may be supplied with gas or liquid fuel through a supply pipe 46 that may have connection with a swivel 47 of any well known form which will permit of constant supply of fuel during rotation of the table 25.

In case it is desired to stop the supply of charges of glass to one of the molds, the glass which would otherwise be fed thereto may be deflected to flow to one side of the table, by means of a spout 48 that may have a pivoted mounting at 49 and may be of bent or offset form intermediate its ends so as to avoid interference with the operation of the shear blades 36.

From the foregoing it will be seen that I provide a machine that may be operated continuously and continuously supplied with glass directly from a tank; one wherein each mold is provided with an individual feeder; one wherein charges of varying size and of different temperature may be supplied to the different molds contained upon a single table; the molds may be of a variety of sizes and charges may be supplied to only selected molds, and removal of one or more molds from service does not necessitate stoppage of the machine.

It will be understood that a plurality of molds may be supplied from a single pocket 27 and that such molds may be alternately moved successively into glass receiving position and pressing or blowing position, by any various known mold shifting devices. This will increase the capacity of the machine and permit a more rapid utilization of the molten glass from the receptacle.

Various changes in detail and general arrangement may be made without departing from the spirit and scope of the invention as defined in the accompanying claims.

I claim as my invention:

1. Apparatus for forming glass articles, comprising a receptacle rotatable in a horizontal plane, a plurality of molds rotatable in a plane beneath said first plane and coaxially with the rotatable receptacle, and means for delivering mold charges from said receptacle to said molds, the receptacle rotating only in the same direction as the molds.

2. Apparatus for forming glass articles, comprising a plurality of glass receptacles rotatable in a horizontal plane and each normally containing a plurality of mold charges, a plurality of molds rotatable in a plane beneath said first plane, and means for delivering mold charges from each of said receptacles to one of said molds.

3. Apparatus for forming glass articles, comprising a plurality of glass receptacles rotatable in a horizontal plane, a plurality of molds rotatable in a plane beneath said first plane, means for delivering mold charges from each of said receptacles to a certain one of said molds, and means for operating upon the glass in each mold to complete an article therein, the said receptacles each normally containing molten glass sufficient for a plurality of mold charges.

4. Apparatus for forming glass articles, comprising a receptacle rotatable in a horizontal plane, a plurality of molds rotatable in a plane beneath said first plane and coaxially with the said receptacle, means for delivering mold charges from said receptacle to said molds, and means for moving the molds into and out of glass receiving position during said rotative movement, the receptacle rotating only in the same direction as the molds.

5. Apparatus for forming glass articles, comprising a receptacle rotatable in a horizontal plane, a plurality of molds rotatable in a plane beneath said first plane, means for segregating mold charges from a body of molten glass in said receptacle and delivering the same to said molds, means for moving the molds into and out of glass receiving position during said rotative movement, and separate means for operating upon the glass in each of said molds when they have been moved out of said receiving position, the receptacle being provided with a plurality of discharge outlets each of which is in radial alignment with one of the molds.

6. Apparatus for forming glass articles, comprising two coaxial superposed tables mounted for synchronous rotatable movement, a glass receptacle in the upper table, molds mounted upon the lower table, means for moving said molds radially of said table, means for supplying glass from said receptacle to said molds while in one radial position, and means for operating upon the glass when said molds occupy another radial position.

7. Apparatus for forming glass articles, comprising a rotatably mounted glass receptacle, means for supplying molten glass to said receptacle, a rotatably mounted mold table disposed beneath and coaxial with said receptacle and provided with a plurality of molds positioned to receive charges of glass from said receptacle, and means associated with each mold for controlling the supply of glass from said receptacle, the receptacle rotating with and always in the same direction as the mold table.

8. Apparatus for forming glass articles, comprising a mold carrier rotatable in a horizontal plane, molds on said carrier, means for moving said molds radially toward the periphery of the carrier, a traveling receptacle containing a plurality of charges, means for supplying charges of molten glass from said receptacle to said molds while in their outer radial positions, means for retracting the molds toward the axis of the carrier, and means for operating upon the glass in said molds when in retracted position.

9. Apparatus for forming glass articles, comprising a mold carrier rotatable in a horizontal plane, molds on said carrier, means for moving said molds radially toward the periphery of the carrier, a rotatable receptacle disposed coaxially of the carrier and movable therewith, means for supplying molten glass from said receptacle to said molds while in their outer radial positions, means for retracting the molds from said position, and means for operating upon the glass in said molds when in retracted position.

10. Apparatus for forming glass articles, comprising a mold carrier rotatable in a horizontal plane, molds on said carrier, a receptacle above the carrier, means for moving said molds radially of the carrier, separate means above each mold, and movable with the carrier, for supplying molten glass from said receptacle to the molds while the molds are in one radial position, means for retracting the molds to another radial position, and means for operating upon the glass in said molds when in retracted position.

11. Apparatus for forming glass articles, comprising a mold carrier rotatable in a horizontal plane, molds on said carrier, a receptacle above the carrier, means for moving said molds radially of the carrier, separate means above each mold, and movable with the carrier, for supplying molten glass from said receptacle to the molds while the molds are in one radial position, means for retracting the molds to another radial position, and means for operating upon the glass in said molds when in retracted position, the said glass supplying means being automatically operable upon movement of the molds to glass-receiving position.

12. Apparatus for forming glass articles, comprising a mold carrier rotatable in a horizontal plane, molds on said carrier, means for moving said molds radially toward the periphery of the carrier, a traveling receptacle containing a plurality of charges, means for supplying charges of molten glass from said receptacles to said molds while in their outer radial positions and during rotation of the carrier, means for retracting the molds toward the axis of the carrier, and means for operating upon the glass in said molds when in retracted position, the glass supplying means and the mold moving means being operable in definite relation to the movement of the mold carrier.

13. Apparatus for forming glass articles, comprising a plurality of traveling molds, a receptacle movable with the molds and adapted to contain a plurality of charges of molten glass, a plurality of feeding devices, and means controlled in timed relation with the movement of the molds for selectively actuating said devices to feed measured quantities of glass from said receptacle to certain molds.

14. Apparatus for forming glass articles, comprising a plurality of traveling molds, a receptacle movable with said molds and adapted to contain a plurality of charges of molten glass, a feeding device associated with each of said molds, and controlled in timed relation with the movement of the molds, for actuating said feeding devices to feed charges of glass from said receptacle to the molds.

In testimony whereof I, the said DANIEL A. RIPLEY have hereunto set my hand.

DANIEL A. RIPLEY.